Jan. 31, 1967  F. STERZER  3,302,028
HIGH EFFICIENCY LIGHT MODULATION SYSTEM
Filed June 10, 1963
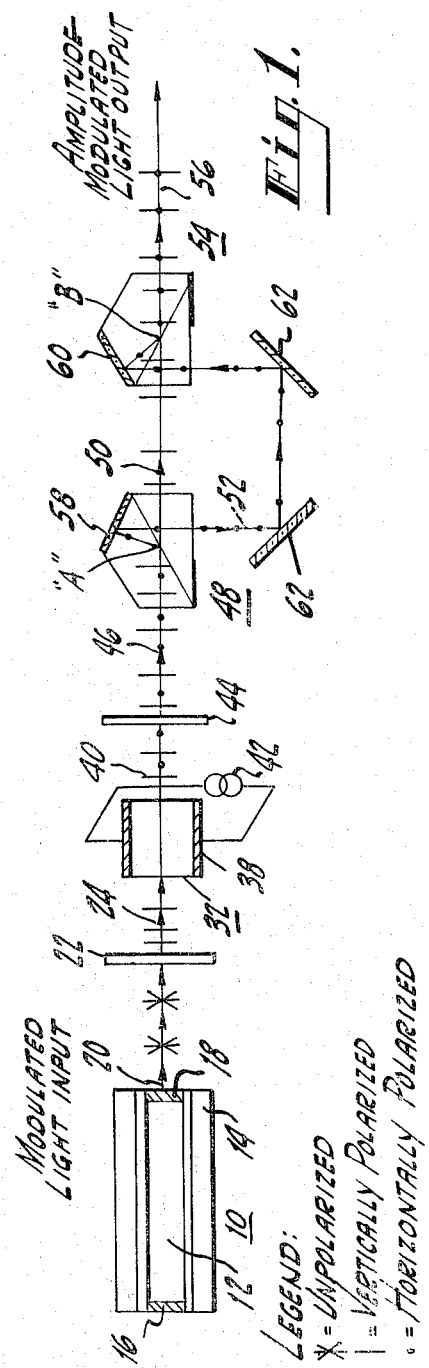
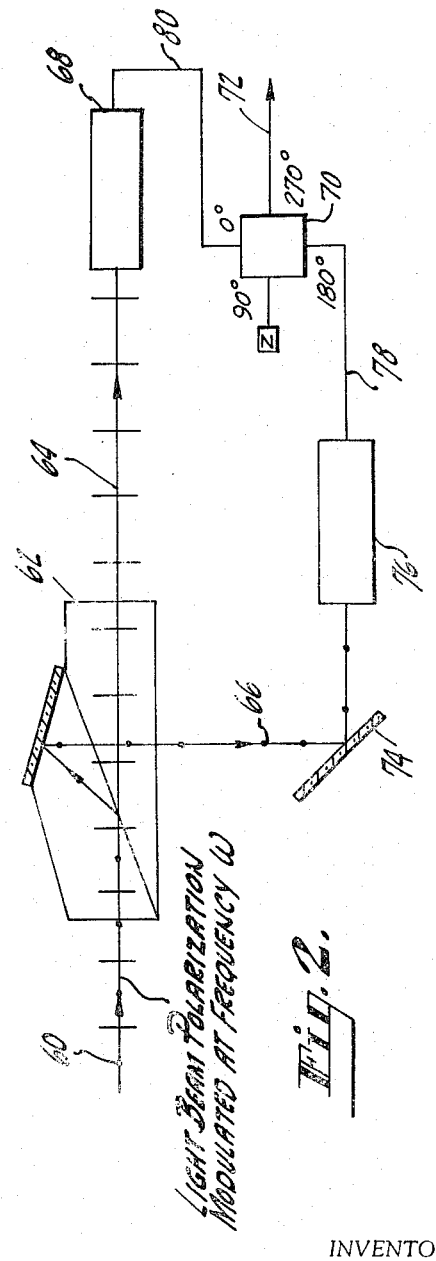
INVENTOR.
FRED STERZER
BY
Attorney

United States Patent Office 3,302,028
Patented Jan. 31, 1967

3,302,028
HIGH EFFICIENCY LIGHT MODULATION SYSTEM
Fred Sterzer, Princeton, N.J., assignor to Radio Corporation of America, a corporation of Delaware
Filed June 10, 1963, Ser. No. 286,682
6 Claims. (Cl. 250—199)

This invention relates to optical communication systems. In particular, this invention relates to a novel method of and means for modulating or for demodulating a light beam, e.g. laser beam.

The term laser is a name used to refer to a device which provides "light amplification by stimulated emission of radiation." The laser device is commonly used as a source of coherent light.

In general, a laser includes an active laser material that will produce stimulated emission of radiation and an excitation source of energy that pumps power into the active material. Usually, for feedback purposes, it is desirable to position the active laser material in an optically resonant cavity.

A laser of the type briefly described above produces a coherent beam of electromagnetic radiation which may be used for communicating information by signal modulating the laser beam with the desired information. As an example, it has been suggested to communicate telephone conversations, radio broadcasts, and other similar information by means of laser beams.

In order to communicate this information, it is desirable to modulate the laser beam in some economic fashion. Generally, the average light intensity transmitted by a conventional electro-optic amplitude modulator of the type described in the prior art, or the average light intensity detected by a conventional optical detector for polarization modulated light, neglecting losses in the system, is only equal to one half of the intensity of the light that is incident on either the modulator or the receiving system.

Thus, the prior art electro-optic modulator system and the demodulating system have, on the average, effectively discarded due to the modulating or demodulating process approximately one half of the light energy that is available.

It is therefore an object of this invention to provide an improved light communication device.

It is another object of this invention to provide a novel light modulating device having improved efficiency.

It is a further object of this invention to provide an improved light demodulator having a high efficiency.

These and other objects are accomplished in accordance with this invention by providing a light modulator or demodulator using a reflective analyzer. In the modulator embodiment, a light beam, such as a laser beam, is polarized and passed through a signal controlled electro-optic light modulator. The modulator rotates the polarization of the light by an amount which depends upon the modulating signal amplitude. The now polarization modulated light beam is then passed into a separation, or reflective, type analyzing prism which separates the light that has been polarized in one direction from the light which is polarized in an orthogonal direction. For example, the prism may separate horizontally and vertically polarized portions of a light beam, pass the vertically polarized portion of the light beam, and reflect the horizontally polarized portion of the light beam. The path length of one of the portions, e.g. the horizontally polarized portion, of the light is then adjusted to differ from the other portion by one half of the modulation wave length. In other words, the modulation of the one portion is inverted, and is then added constructively to the other portion of the light beam. This provides an amplitude modulated light output whose average intensity is substantially the same magnitude as that of the polarized unmodulated light input.

In a demodulator embodiment of this invention, a light beam which is signal controlled polarization modulated, is passed through a polarization separator, and one polarized portion of the beam strikes an optical demodulator, e.g. a phototube, directly. The orthogonally polarized portion of the light beam is reflected to pass in to a second optical demodulator. The signals from the two demodulators are combined to add constructively, i.e. one is inverted and then added to the other. Thus, the demodulator system effectively adds the two portions of the light beam to provide an output signal that is substantially equal to the total input signal of the light beam.

The invention will be described in greater detail by reference to the accompanying drawings wherein:

FIG. 1 is a partially schematic view of a "push-pull" light modulator in accordance with this invention; and, FIG. 2 is a partially schematic view of a push-pull light demodulator in accordance with this invention.

FIG. 1 shows an apparatus 10 for producing coherent radiation. When the coherent radiation is in the light spectral range, the device 10 is known as a laser. The laser 10 comprises an active material 12, a pumping source 14 and a pair of optical reflecting surfaces 16 and 18 which define the opposite ends of an optical resonant cavity.

The active material 12 may comprises a substance which has two atomic states, or energy levels, separated by an amount corresponding to a characteristic frequency of the active material 12. The active laser material 12 has the property of being excitable into an inverted population density condition, i.e. the property that an excess population of ions can be established in the upper energy state. The active material 12 emits substantially coherent radiation as the atomic particles return from the higher energy level to a lower energy level. A specific example of an active material 12 which exhibits laser action is calcium fluoride doped with divalent dysprosium. Another example of an active material 12, which is known to exhibit laser action, is a gallium arsenide P–N junction.

The pumping source 14 may comprise any source of energy which is capable of exciting the atomic particles in the active material 12 from a lower energy level into the desired higher energy level. Thus, the pumping source 14 is a source of radiation which is capable of establishing the inverted population density condition in the active material 12. Examples of such pumping sources are a means for providing an RF field, a xenon flash tube, or other suitable known types of energy sources. When the P–N junction type of active material 12 is used, the active material may be electrically pumped by a power source connected to the electrodes of the junction.

The active material 12 is positioned in an optical resonant cavity. Thus, adjacent to the ends of the active material 12 are light reflecting mirrors 16 and 18. One of the mirrors, e.g. light reflecting device 18, is made so that at least a portion thereof is partially transparent so that an output unmodulated, coherent light beam 20 may be obtained from the device 10. When the active material 12 is made of certain materials, e.g. gallium arsenide, the ends of the P–N junction may be optically flat and/or polished, and the air interface will function as a light reflecting surface.

The light beam 20 from the laser 10 is then passed through a light polarizer 22. When the light beam 20 is polarized, the polarizer 22 may be omitted. Assuming that a polarizer is used, then polarizer 22 may be any conventional vertical light polarizer such as a conventional Nicol prism. The balance of the description will assume that the light beam 24 is vertically polarized either by means of the polarizer 22, or due to the fact that the laser light 20 is vertically polarized.

The coherent light beam 24 is unmodulated and is passed through a light modulator 32. The polarization light modulator 32 may be of any type, such as an electro-optic or magneto-optic cell. In brief, the light modulator 32 changes the polarization of the light beam passing therethrough in response to an electric signal.

An example of a modulator 32 preferred for its simplicity and efficiency is an electrically controlled modulator comprising a crystal 34 of a cubic material exhibiting the linear electro-optic effect. One example of a suitable cubic material is cuprous chloride. On the crystal 34 there are positioned two electrodes 36 and 38 for applying a potential thereto. The potential on the electrodes 36 and 38 is provided by a signal controlled source 42. Light modulators are described in an article by F. Sterzer, D. J. Blattner, H. K. Johnson, S. F. Miniter, "Cuprous Chloride Light Modulators," Digest of Technical Papers, February 1963, International Solid States Circuits Conference, Philadelphia, Pennsylvania.

Electro-optic modulators modulate the polarization of the light beam passing therethrough in response to an electric field applied to the electrodes. Thus, the light beam 40 passing out of the modulator 32 includes both vertically polarized components and horizontally polarized components, with the magnitude of each component depending upon the signal applied from the source 42. Other types of known light polarization modulators, such as magneto-optic modulators, may be used instead of the electro-optic modulator 32.

Positioned in the path of the signal modulated light beam 40 is an optical biasing member or quarter wavelength plate 44. The quarter wavelength plate 44 is used for changing the polarization of the light beam 40 so that the light modulator 32 will transmit approximately 50% of the light incident thereon when no signal potential is applied thereto. When desired, an electric D.C. bias may be applied to the electro-optic light modulator 32, which will be of sufficient magnitude to cause transmission of approximately 50% of the light incident on the electro-optic cell, in addition to the modulating voltage from source 42, and the quarter wavelength plate 44 may be omitted. Thus, the light beam 46 emerging from the quarter wavelength plate 44 will be a coherent light beam having its polarization changed from the vertical polarized plane to the horizontally polarized plane depending upon the magnitude of the signal applied by signal controlled source 42. Because of the presence of the quarter wavelength plate 44, or the proper D.C. electric bias, the light beam 46 will be circularly polarized in the absence of the modulating voltage. Quarter wavelength plates and their operation are well known, and the plate 44 may be made of a material such as mica.

Positioned in the path of the polarization modulated light beam 46 is a reflection type analyzer 48. The reflection type analyzer 48 will pass light of one polarization, vertically polarized in this instance, and will reflect light of the other polarization. This type of analyzer is to be distinguished from the absorption type analyzers which absorb the light of the polarization that is not passed. An example of a reflection type analyzer is a Foster-Seeley prism. Foster-Seeley prisms are known in the art and are described in detail in L. V. Foster, "A Polarizing Vertical Illumination," J.O.S.A., p. 124, April 1938.

During operation, the vertically polarized portion or component of the light beam 46 is passed directly through the Foster-Seeley prism 48 to emerge as an amplitude modulated light beam 50. The horizontal polarized portion or component of the light beam 46 is internally reflected in the Foster-Seeley prism and passed out as a light beam 52. The light beam 52 is a "negative modulated" beam. Thus, the beam 52 is the total beam minus the amplitude modulated signal beam 50 which is passed directly through the prism 48. In other words, the light beam 52 is a modulated light beam with its modulation 180° out of phase with respect to that of the beam 50.

The amplitude modulated light beam 50 is then passed through another reflection type analyzer 54, which functions as an optical adder, to pass out and be transmitted as an amplitude modulated light beam 56. The horizontally polarized portion of the beam, which was separated in the reflection analyzer 48, is delayed so as to be inverted and then recombined, in phase, with the vertically polarized portion 50. In other words, the path length between point A of the analyzer 48 and point B of the analyzer 54 is arranged so that the modulation of the horizontally polarized component 52 is in phase with respect to the modulation of the portion 50 as these two components recombine at point B in the analyzer 54, i.e. peak amplitude is added to peak amplitude. Therefore, the output beam 56 is amplitude modulated and contains both the signal controlled vertically polarized portion 50 and the inverted signal controlled horizontal polarized portion 52. The path length arrangement for the beam 52 may be accomplished by using conventional reflectors such as by providing silvered surfaces 58 and 60 on the reflection type analyzers 48 and 54 and by providing a pair of totally reflecting mirrors 62 as illustrated in the drawing. The orientation of the mirrors 62 is adjusted so that the plane of polarization of the horizontally polarized portion 52 is not changed by being reflected from these mirrors 62.

It can be shown mathematically that the light transmitted by the conventional modulator is given by the relationship:

$$I = \frac{I_0}{2}\left[1 + \sin\left(\frac{\pi}{V_{\lambda/2}} V \cos \omega t\right)\right] \quad (1)$$

where $I_0$ = intensity of light incident on crystal
$V \cos \omega t$ = modulating voltage at a frequency of $\omega$
$V_{\lambda/2}$ = voltage required for full transmission through the light modulator Thus, the average light intensity transmitted by a conventional light modulator is only one half the intensity of the light incident on the modulator (neglecting losses).

However, in the modulator illustrated the intensities of the two beams 50 and 52 leaving the reflection type analyzer 48 are respectively $$I_H = \frac{I_0}{2}\left[1 + \sin\left(\frac{\pi}{V_{\lambda/2}} V \cos \omega t\right)\right] \quad (2)$$

$$I_V = \frac{I_0}{2}\left[1 - \sin\left(\frac{\pi}{V_{\lambda/2}} V \cos \omega t\right)\right] \quad (3)$$

where the subscripts of I refer to the direction of polarization of each beam as shown in FIGURE 1. If the path difference, i.e. from points "A" to "B" of the two beams 50 and 52 between the prisms 48 and 54 is adjusted to delay the horizontally polarized portion, or beam 52, by a time $\pi/\omega$, i.e. 180°, and to invert the polarity of the horizontally polarized portion 52 with respect to the vertically polarized portion 50, then the intensities of the two beams, i.e. the combined beam 56, leaving the prism 54 are given by the relations:

$$(I_H)_{out} = \frac{I_0}{2}\left\{1 + \sin\left[\frac{\pi}{V_{\lambda/2}} V \cos(\omega t + \pi + \theta)\right]\right\} \quad (4)$$

$$= \frac{I_0}{2}\left\{1 - \sin\left[\frac{\pi}{V_{\lambda/2}} V \cos(\omega t\ \theta)\right]\right\} \quad (5)$$

$$(I_V)_{out} = \frac{I_0}{2}\left\{1 - \sin\left[\frac{\pi}{V_{\lambda/2}} V \cos(\omega t + \theta)\right]\right\} \quad (6)$$

The total intensity of beam 56 of the output is therefore $$(I_T)_{out} = I_0 \left\{ 1 - \sin \left[ \frac{\pi}{V_{\lambda/2}} V \cos(\omega t + \theta) \right] \right\} \quad (7)$$

showing that the intensity of the light transmitted by the "push-pull" modulator is twice that (also neglecting losses) of a conventional modulator.

FIG. 2 shows a "push-pull" system for demodulating a polarization modulated light beam 60. The light beam 60 is a polarization modulated light beam which includes both horizontal and vertical polarized components, and is different from the amplitude modulated light beam 56 of FIG. 1. Thus, the demodulator system of this invention would not be used with the modulator system of FIG. 1 since the entire amplitude modulated output beam 56 of FIG. 1 may be detected by an optical demodulator directly. The demodulator of FIG. 2 is to be used, for example, with a modulation device of the type produced when the analyzers 48 and 54 are omitted from the transmitting system of FIG. 1.

In FIG. 2 the polarization modulated beam 60 includes both vertically polarized components and horizontally polarized components. The beam 60 is directed into a polarization separating type of analyzer 62 which separates vertically polarized components 64 from the horizontally polarized components 66. The separating prism 62 may be a Foster-Seeley prism as has been explained.

The vertically polarized component 64 is an amplitude modulated beam which is fed into an optical demodulator 68. The demodulator 68 may be a photomultiplier tube. The electrical signal from the optical demodulator 68 is an amplitude modulated signal which is fed into a hybrid ring 70 to provide a portion of the power output 72.

The horizontally polarized component 66 of the light beam 60 is reflected from a mirror 74 into another optical demodulator 76. The optical demodulator 76 may also comprise a photomultiplier tube. The signal from the optical demodulator 76 is also fed into the hybrid ring 70 and in such a manner as to be 180° out of phase with the signal from the optical demodulator 68. In other words, the electrical signal 78 is inverted and added to the electrical signal 80 by the hybrid ring 20. Thus, the optical outputs of the optical demodulators 68 and 76 are added in the hybrid ring 70 to produce a power output 72 that is, on the average, substantially twice that of each demodulator signal.

The push-pull demodulator of FIG. 2 would be used in cases where the frequency used for modulating the light beam is so low that the path difference between the two beams 50 and 52 of FIG. 1 becomes inconveniently large. Also, the band width of the demodulator of FIG. 2 can be made large since hybrid rings with the active band widths can easily be constructed. Hybrid rings are known in the art, and any conventional structure for use in constructively adding signals that are 180° out of phase may be used.

What is claimed is:

1. A light beam system for use with a polarization modulated beam comprising
   means for separating the beam into two components having different polarizations,
   means for inverting the modulation of one of said components, and
   means for adding said components after said one of said components has been inverted.

2. A light beam system as in claim 1 wherein said components are demodulated and converted into electrical energy prior to said means for inverting one of said components.

3. A light modulator comprising
   means for producing a coherent light beam,
   an electro-optic polarization modulator in the path of said beam,
   a separation type analyzer in the path of the beam passing through said modulator,
   an optical adder in the path of the beam passing directly through said analyzer,
   means for inverting the modulation on one of the portions of said beam separated in said analyzer, and
   means for directing said one of said portions into said adder.

4. A light system for use with a polarization modulated light beam comprising
   means for separating said light beam into horizontally polarized components and vertically polarized components,
   means for inverting the modulation on one of said components to reduce the relative phase difference between the intensity variations of said components to a negligible value, and
   means for adding said components after said one of said components has been inverted.

5. A light system for amplitude modulating a coherent light beam comprising
   an electro-optic cell for polarization modulating a light beam,
   a separation type analyzer in the path of light passing through said electro-optic cell for separating the light passing through said electro-optic cell into two components,
   one of said components having a first polarization and the other of said components having a second polarization,
   means for inverting the modulation of one of said components, and
   means for adding said two components after said means for inverting.

6. A laser beam modulation system comprising a laser for producing a beam of coherent light,
   an electro-optic cell for applying a polarization type modulation signal to said beam,
   a first Foster-Seeley prism for separating light having a first polarization from light having a second polarization,
   means for inverting the modulation signal on the light beam having said first polarization, and
   a second Foster-Seeley prism for adding the light having the inverted modulation signal to said light having said second polarization.

References Cited by the Examiner
UNITED STATES PATENTS

| | | | |
|---|---|---|---|
| 2,074,106 | 3/1937 | Foster | 88—65 X |
| 2,274,110 | 2/1942 | Ward | 88—65 |
| 2,745,316 | 5/1956 | Sziklai | 88—65 X |

JOHN W. CALDWELL, *Primary Examiner.*